United States Patent [19]

Iida

[11] Patent Number: 4,464,095
[45] Date of Patent: Aug. 7, 1984

[54] HYDRAULIC ENERGY CONVERTER

[76] Inventor: Kango Iida, 579, Yonezu-cho, Hamamatsu-shi, Shizuoka-ken, Japan, 432

[21] Appl. No.: 392,170

[22] Filed: Jun. 25, 1982

[51] Int. Cl.$^3$ .............................................. F03B 3/12
[52] U.S. Cl. ................................. 416/128; 416/170 R; 415/68
[58] Field of Search .................. 416/128, 170 A, 124, 416/129; 415/68, 502

[56] References Cited

U.S. PATENT DOCUMENTS

| | | | |
|---|---|---|---|
| 1,329,387 | 2/1920 | Fay | 416/124 |
| 1,489,817 | 4/1924 | Campbell | 416/128 |
| 1,615,619 | 1/1927 | Finne | 416/128 |
| 1,719,225 | 7/1929 | Hallander | 416/128 X |
| 1,887,429 | 11/1932 | Price | 416/129 |
| 2,436,768 | 2/1948 | Griffith et al. | 416/128 X |
| 2,437,399 | 3/1948 | Morgan | 416/198 |
| 2,461,931 | 2/1949 | Smith et al. | 416/128 X |
| 2,507,796 | 5/1950 | Martin | 416/128 X |
| 3,088,414 | 5/1963 | Ozgur | 415/68 |
| 3,222,533 | 12/1965 | MacKay | 416/170 A X |
| 3,635,576 | 1/1972 | Wieckmann | 415/68 X |

FOREIGN PATENT DOCUMENTS

| | | | |
|---|---|---|---|
| 978998 | 4/1951 | France | 416/128 |
| 119266 | 9/1918 | United Kingdom | 415/4 A |

*Primary Examiner*—Everette A. Powell, Jr.
*Attorney, Agent, or Firm*—Burgess, Ryan and Wayne

[57] ABSTRACT

A hydraulic-energy conversion system in which an output shaft is drivingly connected through a planetary gear to at least one turbine stage comprising a first turbine rotor with a plurality of left- or right-handed blades and a second turbine rotor with a plurality of right- or left-handed blades. In one embodiment the output shaft and those of the first and second turbine rotors are extended coaxially of each other and the sun gear carried by the output shaft is in mesh with the planet gears carried by the second turbine rotor and in mesh with the internal gear carried by the first turbine rotor. In operation hydraulic energy; that is, water or wind causes the first turbine rotor to rotate in one direction and the second turbine rotor to rotate in the other direction and because of the planetary gear transmission the output shaft can rotate about twice as fast as that of the conventional system, whereby high conversion efficiency and a high output power can be attained. A plurality of turbine stages may be arranged in tandem.

1 Claim, 3 Drawing Figures

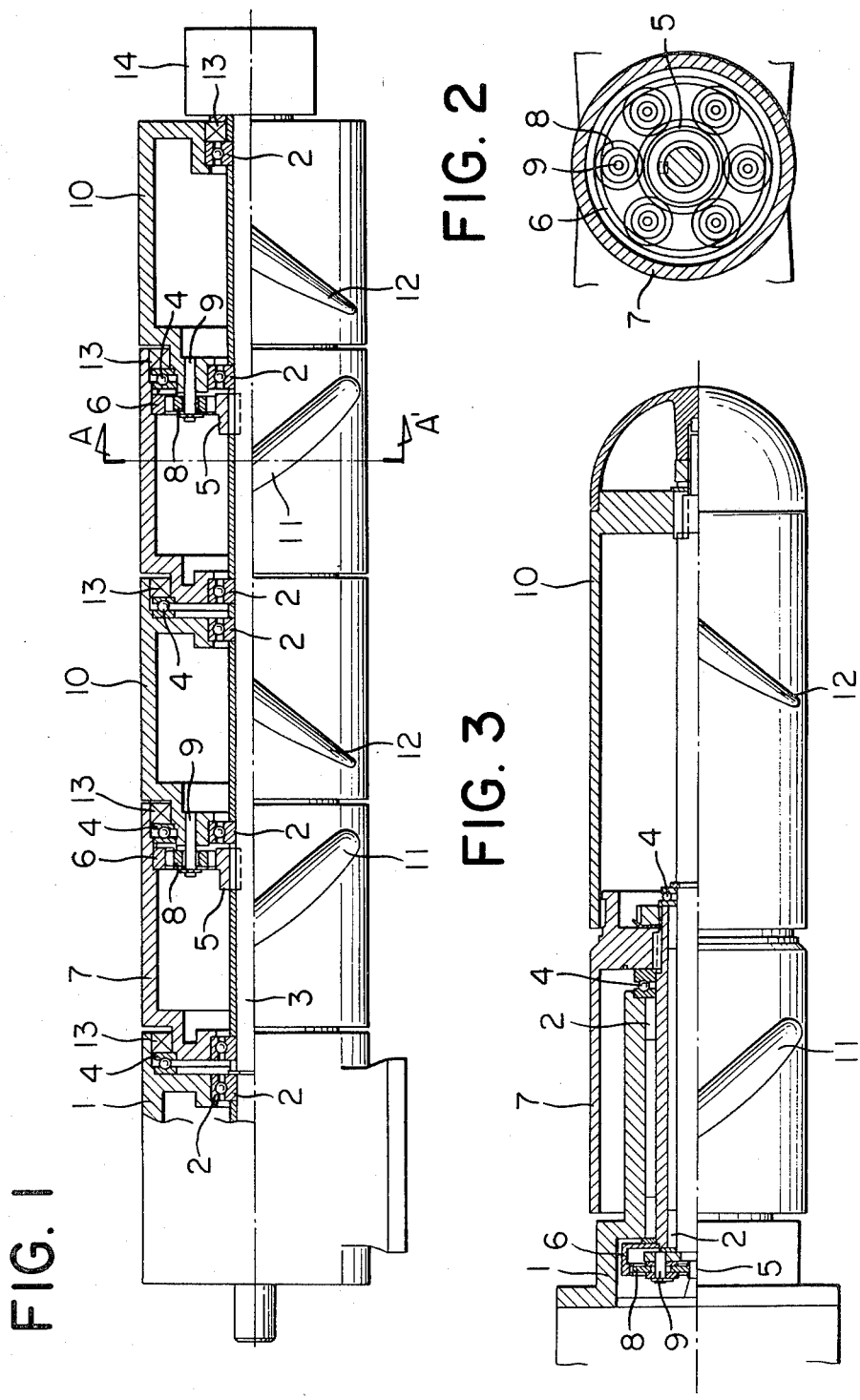

HYDRAULIC ENERGY CONVERTER

BACKGROUND OF THE INVENTION

The present invention relates to a hydraulic energy converter for generating mechanical power in rotary motion from the energy in a stream of fluid.

It is needless to say that it is very useful to utilize as power sources low-density hydraulic power or energy in sea currents, rivers or wind which is limitless in supply on the earth. Therefore, extensive studies and experiments with tremendous efforts have long been made to provide hydraulic energy converters such as water wheels or windmills which can be utilize in practice. However, the conventional hydraulic energy conversion systems are still low in efficiency, so that they have not been successfully used yet in commercial and industrial scales.

SUMMARY OF THE INVENTION

The primary object of the present invention is therefore to provide a hydraulic energy converter especially adapted for converting natural hydraulic energy into mechanical power in rotary motion with a higher degree of efficiency.

According to the present invention, a turbine stage is provided which comprises a first turbine rotor which carries an internal gear and a second turbine rotor which carries planetary gears. One or more such turbine stages are mounted on a common pinion shaft in such a way that the first and second turbine rotors alternate. The first and second turbine rotors have blades which are right-handed and left-handed, respectively, so that they are rotated in opposite directions.

With such arrangement as described above, the internal gear and the planetary gears can be rotated in opposite directions but at the same rotational speed, so that as compared with the conventional hydraulic turbine in which the internal gear is held stationary the rotational speed of the pinion shaft can be almost doubled. In contrast with the conventional turbine with a single bladed rotor which is rotatable only in one direction, turbine rotors which are rotated in the opposite directions are mounted alternately on the common shaft so that a helical flow of a fluid through them can be eliminated. Consequently highly efficient power conversion can be ensured.

The above and other objects, effects and features of the present invention will become more apparent from the following description of preferred embodiments thereof taken in conjunction with the accompanying drawings.

BRIEF DESCRIPTION OF THE DRAWINGS

FIG. 1 is a longitudinal view, partly in section, of a first embodiment of the present invention;

FIG. 2 is a sectional view taken on the line A—A' of FIG. 1; and

FIG. 3 is a side view, partly in section, of a second embodiment of the present invention.

Same reference numerals are used to designate similar parts throughout the figures.

DESCRIPTION OF THE PREFERRED EMBODIMENTS

First Embodiment, FIGS. 1 and 2

Referring to FIGS. 1 and 2, a first embodiment of the present invention will be described. An output shaft 3 is supported by a plurality of bearings 2 which are axially spaced apart from each other and are in turn secured to a casing 1. The output shaft 3 carries a plurality of pinions or sun gears 5 which are axially spaced apart from each other by a suitable distance and are in mesh with planet gears 8 each of which is carried by a shaft 9 which in turn is carried by a second turbine rotor 10. As best shown in FIG. 2, a plurality (six) of planet gears 8 which are in mesh with the same pinion or sun gear 5; that is, which are carried by a common planetary carrier, are in mesh with an internal gear 6 which is formed integral with or rigidly fastened to a first turbine rotor 7. The first turbine rotors each are provided with a plurality of left-handed blades or vanes 11 while the second turbine rotors 10, a plurality of right-handed blades or vanes 12. A pair of first and second turbine rotors 7 and 10 whose internal gear 6 and planet gears 8 are in mesh with each other is referred to as "a turbine stage" in this specification and a plurality of turbine stages (two in the first embodiment as shown in FIG. 1) are mounted in tandem on the output shaft 3 through the bearings 2, and thrust bearings 4 and oil seals 13 are interposed between the frame 1 and its adjacent or the leftmost first turbine rotor 7 and also between the adjacent first and second turbine rotors 7 and 10. The output shaft 3 is supported at its end remote from the frame 1 by a bearing 14. When the hydraulic energy converter is placed in a river or the sea in which the water flows always in one given direction, a float or a supporting leg or anchor may be attached to the bearing 14 so that the hydraulic energy converter may be held in a stabilized state, but when it is used as a wind-energy conversion system, the bearing 14 may be eliminated.

Next, the mode of operation of the first embodiment with the above-described construction as a water-energy conversion system or a wind-energy conversion system will be described. The hydraulic energy causes the first turbine rotors 7 to rotate in the counterclockwise direction and the second turbine rotors 10 to rotate in the clockwise direction so that their rotation is transmitted through their internal gears 6 and planet gears 8 to the sun gears or pinions 5 on the output shaft and consequently the output shaft 3 is caused to rotate in the clockwise direction. The rotational speed N of the output shaft 3 is given by:

$$N = \frac{Z_1(n_1 + n_2)}{Z_2} + n_2$$

where
 $n_1$ is the rotational speed of the first turbine rotor 7
 $n_2$ is the rotational speed of the second turbine rotor 10
 $Z_1$ is the number of teeth of the internal gear 6
 $Z_2$ is the number of teeth of the sun gear or pinion 5

Thus, it is seen that the rotational speed of the output shaft 3 is twice as high as that of the conventional turbine which is provided with only one bladed rotor. When only one turbine rotor; that is, one turbine rotor 7 with its blades 11 is used, as with the conventional hydraulic energy conversion system, it causes helical downflows, but according to the present invention, the left-handed and right-handed blades 11 and 12 are alternately disposed so that no helical downflow occurs and consequently the efficiency of the conversion of the hydraulic energy into the mechanical energy; that is, the rotation of the output shaft 3, can be remarkably increased. More specifically, the output power becomes the sum of those produced by the first and second turbine rotors 7 and 10.

The output shaft 3 can be connected directly or through a suitable reduction or multiplying gear means to an electric generator, a pump, a compressor, a frictional heat generator or the like so that the hydraulic energy; that is, the wind or water power can be efficiently used as various power sources.

Second Embodiment, FIG. 3

The first and second turbine rotors 7 and 10 of the second embodiment are similar in construction to those of the first embodiment, but their shafts are extended toward the casing 1 in coaxial relationship with the output shaft 3 and with each other and the internal gear 6 and the planet gears 8 are carried at the downstream ends, respectively, of the shafts of the first and second turbine rotors 7 and 10 in such a way that they are in mesh with the sun gear or pinion 5 carried by the output shaft 3 in the casing 1. The mode of operation of the second embodiment is substantially similar to that of the first embodiment described above so that no further explanation shall be made.

In both the first and second embodiments, the first and second turbine rotors 7 and 10 have been described as having left-handed blades 11 and right-handed blades 12, respectively, and carrying the internal gears 6 and the planet gears 8, respectively, but it is to be understood that they could be reversed in construction. That is, the first turbine rotors 7 could each have a plurality of right-handed blades and a plurality of planet gears while the second turbine rotors 10, a plurality of left-handed blades and an internal gear.

In summary, according to the present invention the planetary gear or gears are used so that the rotational speeds of the first and second turbine rotors 7 and 10 can be increased. In addition, the first and second turbine rotors 7 and 10 have right- and left-handed blades 11 and 12, respectively, and vice versa so that hydraulic energy can be converted into mechanical energy or rotational power with a higher degree of conversion efficiency.

Furthermore, a plurality of turbine stages, each consisting of the first and second turbine rotors 7 and 10 and one planetary gear set (5, 8 and 6), can be arranged in tandem on the common output shaft 3 in such a way that the first turbine rotors 7 have a plurality of left- or right-handed blades 11 and the second turbine rotors 10, a plurality of right- or left-handed blades 12. Therefore the overall hydraulic energy receiving area; that is, the sum of the circular areas described by the blades of the first and second turbine rotors 7 and 10, are greater. This means that as compared with the conventional hydraulic energy conversion system, the diameters of the turbine blades 11 and 12 can be reduced if the same power is desired. Therefore the turbine rotors and especially their blades 11 and 12 can be relatively easily designed and fabricated which have a higher safety factor capable of withstanding sudden increases in water or wind flow due to storms and heavy rains. In addition, the hydraulic energy converter or prime mover for high-capacity electric generators, pumps, compressors, frictional heat generators or the like can be fabricated at less costs.

When the hydraulic energy converter of the present invention is used as a wind power conversion system, it is preferable to have the turbine rotors 7 and 10 encased in a cylindrical protective casing or the like when the hydraulic energy converter is installed on the top of the roof of a house or building thereby adding a further safety factor or protecting them against damage. Furthermore a suitable wind deflector or the like can be used in combination with the hydraulic energy converter so that even light wind power can be converted into mechanical power at higher efficiency. However it is not preferably to use such a protective casing or shroud and wind deflector when the hydraulic energy converter is installed in a farmland, forest or windbreak belt so that the solar energy can pass through the rotor blades 11 and 12 and be absorbed by plants. Regardless of the desired installation sites, only a minimum space and a minimum installation cost are required.

It has been recently realized throughout the world that fossil fuels are in limited supply and consequently their costs are increasing rapidly and the present invention provides a hydraulic energy converter of the type described and capable of converting into the useful mechanical or rotational energy wind power which is abundant or limitless in supply even though its energy density is low, whereby the present invention provides a considerably advantageous industrial solution to the grave, pressing and worldwide energy problems.

What is claimed is:

1. A hydraulic energy converter comprising one or more pinions mounted on an output shaft which is rotatably supported through bearings by a casing, and one or more turbine stages, each of which comprises a first turbine rotor with an internal gear in mesh with a plurality of planet gears and provided with blades thereon oriented in one desired direction and a second turbine rotor with said planet gears in mesh with said pinion and provided with blades thereon oriented in the other direction, mounted on said output shaft in such a way that each of said first turbine rotors and each of said second turbine rotors are arranged alternately and rotated in the opposite direction, respectively, so that said output shaft is rotated in a predetermined direction.

* * * * *